(12) United States Patent
Kim et al.

(10) Patent No.: US 11,668,962 B2
(45) Date of Patent: *Jun. 6, 2023

(54) META DEVICE AND MANUFACTURING METHOD THEREOF

(71) Applicant: SAMSUNG ELECTRONICS CO., LTD., Suwon-si (KR)

(72) Inventors: Sunil Kim, Osan-si (KR); Changbum Lee, Seoul (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

This patent is subject to a terminal disclaimer.

(21) Appl. No.: 17/075,007

(22) Filed: Oct. 20, 2020

(65) Prior Publication Data

US 2021/0033892 A1 Feb. 4, 2021

Related U.S. Application Data

(63) Continuation of application No. 16/139,857, filed on Sep. 24, 2018, now Pat. No. 10,845,627.

(30) Foreign Application Priority Data

Oct. 11, 2017 (KR) .......................... 10-2017-0131652

(51) Int. Cl.
*G02F 1/03* (2006.01)
*G02F 1/07* (2006.01)
(Continued)

(52) U.S. Cl.
CPC ............. *G02F 1/015* (2013.01); *G02B 1/002* (2013.01); *G02F 1/0063* (2013.01); *G02F 1/29* (2013.01);
(Continued)

(58) Field of Classification Search
CPC ......... B82Y 20/00; G02B 1/002; G02F 1/015; G02F 1/0063; G02F 1/29; G02F 1/0154;
(Continued)

(56) References Cited

U.S. PATENT DOCUMENTS 5,012,311 A 4/1991 Shirato
6,150,220 A 11/2000 Huh et al.
(Continued)

FOREIGN PATENT DOCUMENTS

JP 5785122 B2 9/2015
KR 10-1999-0071115 A 9/1999
(Continued)

OTHER PUBLICATIONS

Communication dated Sep. 25, 2021, issued by the Korean Patent Office in counterpart Korean Patent Application No. 10-2017-0131652.
A Forouzmand et al. "Tunable two dimensional optical beam steering with reconfigurable indium tin oxide plasmonic reflectarray metasurface" Journal of Optics, vol. 18, 2016 (7 pages total).

*Primary Examiner* — Mahidere S Sahle
(74) *Attorney, Agent, or Firm* — Sughrue Mion, PLLC (57) ABSTRACT

A beam steering apparatus may include: a mirror; a refractive index modulation layer disposed on the mirror; a nanoantenna on the refractive index modulation layer; and an insulating layer disposed between the nanoantenna and the refractive index modulation layer, wherein the insulating layer has a thickness distribution in which a first thickness of the insulating layer on a central region of the mirror is less than a second thickness of the insulating layer on an edge region of the mirror, wherein a refractive index of the refractive index modulation layer is modulated to control propagation direction of beam.

9 Claims, 5 Drawing Sheets

(51) Int. Cl.
  *G02F 1/015* (2006.01)
  *G02B 1/00* (2006.01)
  *G02F 1/29* (2006.01)
  *G02F 1/00* (2006.01)
  *B82Y 20/00* (2011.01)
  *H01Q 15/00* (2006.01)

(52) U.S. Cl.
  CPC ............. *B82Y 20/00* (2013.01); *G02F 1/0154* (2021.01); *G02F 1/292* (2013.01); *G02F 2202/30* (2013.01); *H01Q 15/0086* (2013.01)

(58) Field of Classification Search
  CPC .... G02F 1/292; G02F 1/1335; G02F 2202/30; H01Q 15/0086
  USPC ................................................. 359/240, 245
  See application file for complete search history.

(56) References Cited

U.S. PATENT DOCUMENTS

| | | | |
|---|---|---|---|
| 10,845,627 B2* | 11/2020 | Kim | ........................ G02F 1/0063 |
| 2013/0215483 A1 | 8/2013 | Han et al. | |
| 2017/0168324 A1 | 6/2017 | Kim et al. | |
| 2017/0195755 A1 | 7/2017 | Schindler et al. | |
| 2017/0338567 A1 | 11/2017 | Puscasu et al. | |

FOREIGN PATENT DOCUMENTS

| | | | | |
|---|---|---|---|---|
| KR | 10-2013-0096523 A | 8/2013 | | |
| KR | 10-2017-0068372 A | 6/2017 | | |
| WO | WO-2018140829 A1 * | 8/2018 | ............... | G02F 1/29 |

\* cited by examiner

META DEVICE AND MANUFACTURING METHOD THEREOF

CROSS-REFERENCE TO THE RELATED APPLICATIONS

This application is Continuation Application of U.S. application Ser. No. 16/139,857, filed on Sep. 24, 2018, which claims the benefit of Korean Patent Application No. 10-2017-0131652, filed on Oct. 11, 2017, in the Korean Intellectual Property Office, the disclosures of which are incorporated herein in their entirety by reference.

BACKGROUND

1. Field

The present disclosure relates to a meta device that includes a nanoantenna.

2. Description of the Related Art

Research into optical devices for adjusting phases or reflectivity of beams or steering beams has been recently conducted. A mechanical optical device rotates a laser light source or uses a microelectromechanical system (MEMS). A non-mechanical optical device may use a waveguide structure or a nanoantenna structure. An optical device using a waveguide structure electrically or thermally changes refractive indices of waveguides to thereby adjust phases of beams or steer the beams.

A mechanical optical device has to include a motor or an MEMS for physical implementation of the mechanical optical device and thus may have a great volume and may be costly. An optical device using a motor may generate noise, and an optical device using an MEMS may generate vibration, which limits applications of such optical devices. Since an optical device having a waveguide structure requires a driving pixel in each waveguide, circuits and elements in the optical device may become complicated, and manufacturing costs of the optical device may increase. An optical device including a nanoantenna uses a refractive index modulation layer and thus has a beam phase change function and a beam steering function.

SUMMARY

One or more example embodiments provide a meta device including a nanoantenna having a uniform breakdown voltage characteristic.

Additional aspects will be set forth in part in the description which follows and, in part, will be apparent from the description, or may be learned by practice of the presented example embodiments.

According to an aspect of an example embodiment, a meta device may include: a substrate; a mirror disposed on the substrate; a refractive index modulation layer disposed on the mirror; a nanoantenna facing the mirror with the refractive index modulation layer, the refractive index modulation layer being disposed between the nanoantenna and the mirror; and an insulating layer disposed between the nanoantenna and the refractive index modulation layer and having a non-uniform thickness.

With respect to a location of the mirror, the insulating layer may have a thickness distribution in which a first thickness of the insulating layer in a central region is less than a second thickness of the insulating layer in an edge region.

The second thickness of the insulating layer in the edge region may be about 1.5 times or more than the first thickness of the insulating layer in the central region.

A maximum length element of the edge region may be 2 times or more than the first thickness of the insulating layer in the central region.

With respect to a location of the mirror, the insulating layer may have a thickness distribution in which a first thickness of the insulating layer in a neighboring region is greater than a second thickness of the insulating layer in a non-neighboring region.

The insulating layer may include a first insulating layer having a uniform thickness and a second insulating layer disposed on at least some portions of the first insulating layer.

The first insulating layer may include a different material from the second insulating layer.

The nanoantenna may include a metal material or a semiconductor material.

The insulating layer may include at least one of silicon oxide, silicon nitride, aluminum oxide, and hafnium oxide.

The mirror may include a conductive material.

The refractive index modulation layer may include an oxide semiconductor.

The nanoantenna may include a plurality of nanoantenna elements.

The meta device may further include an electrode wire electrically connected to the nanoantenna.

According to an aspect of an example embodiment, a meta device may include: a substrate; a mirror disposed on the substrate; a first insulating layer disposed on the substrate and the mirror; a refractive index modulation layer disposed on the first insulating layer and a first upper surface of the mirror; a second insulating layer disposed on the refractive index modulation layer and the first insulating layer; and a nanoantenna disposed on the second insulating layer and a second upper surface of the refractive index modulation layer.

The meta device may further include an electrode wire electrically connected to the refractive index modulation layer and including a through electrode penetrating a via in the second insulating layer.

With respect to a location of the mirror, the via that the through electrode penetrates may be in an edge region or a neighboring region.

According to an aspect of an example embodiment, a method of manufacturing a meta device may include: preparing a substrate; patterning and forming a mirror on the substrate; forming a refractive index modulation layer so as to contact at least some portions of the mirror; patterning and forming a first insulating layer in an edge region of the mirror; forming a second insulating layer on the first insulating layer and the mirror; and forming a nanoantenna on the second insulating layer so as to face the mirror.

The first insulating layer may include a different material from the second insulating layer.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Hereinafter, a meta device will be described in detail with reference to the attached drawings.

Reference will now be made in detail to embodiments, examples of which are illustrated in the accompanying drawings, wherein like reference numerals refer to like elements throughout. Sizes of components in the drawings may be exaggerated for convenience of explanation. While such terms as "first," "second," etc., may be used to describe various components, such components must not be limited to the above terms. The above terms are used only to distinguish one component from another.

An expression used in the singular encompasses the expression of the plural and vice versa, unless it has a clearly different meaning in the context. It will be further understood that the terms "comprises" and/or "comprising" used herein specify the presence of stated features or components, but do not preclude the presence or addition of one or more other features or components. Expressions such as "at least one of," when preceding a list of elements, modify the entire list of elements and do not modify the individual elements of the list.

Figure 1:
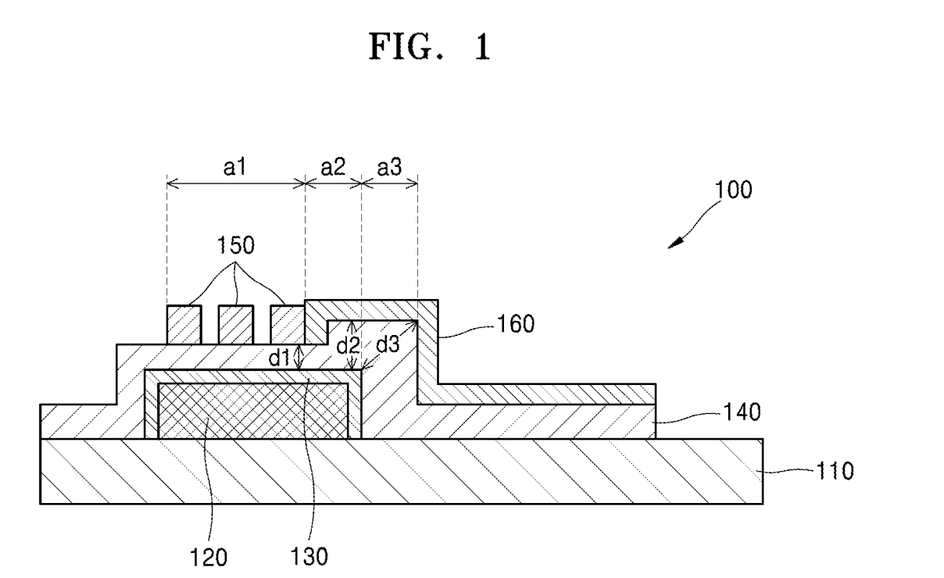
FIG. 1 is a schematic cross-sectional view of a meta device according to an example embodiment.

FIG. 1 is a schematic cross-sectional view of a meta device 100 according to an example embodiment.

Referring to FIG. 1, the meta device 100 includes a substrate 110, a mirror 120, a refractive index modulation layer 130, an insulating layer 140, a nanoantenna 150, and an electrode wire 160.

The substrate 110 may include a glass substrate, a silicon substrate, a sapphire substrate, or a polymer substrate, but is not limited thereto.

The mirror 120 may be on the substrate 110. The mirror 120 may receive an external electrical input. For example, the mirror 120 may receive a voltage or electrical signal from an external electrode. For example, the mirror 120 may include a conductive material. For example, the mirror 120 may include a metal material such as gold (Au), platinum (Pt), silver (Ag), or copper (Cu).

The refractive index modulation layer 130 may be on the mirror 120. The refractive index modulation layer 130 may cover at least some portions of the mirror 120. The refractive index modulation layer 130 may include a semiconductor. For example, the refractive index modulation layer 130 may include zinc oxide (ZnO), tin oxide ($SnO_2$), titanium oxide ($TiO_2$), indium tin oxide (ITO) ($In_2O_3+SnO_2$), indium zinc oxide (IZO) ($In_2O_3+ZnO$), zinc tin oxide (ZTO) ($ZnO+SnO_2$), zinc indium tin oxide (ZITO) ($ZnO+In_2O_3+SnO_2$), Ga-doped ZnO (GZO), Al-doped ZnO (AZO), F-doped $SnO_2$ (FTO), a compound thereof, or a mixture thereof.

The insulating layer 140 may be on the refractive index modulation layer 130. For example, the insulating layer 140 may include silicon oxide ($SiO_2$), silicon nitride (SiNx), hafnium oxide ($HfO_2$), or aluminum oxide ($Al_2O_3$). A thickness of the insulating layer 140 may not be uniform. For example, with respect to a location of the mirror 120 in a vertical direction, the insulating layer 140 may be divided into a central region a1, an edge region a2, and a neighboring region a3. In at least two of the central region a1, the edge region a2, and the neighboring region a3, the insulating layer 140 may have different thickness distributions. For example, the insulating layer 140 may have a thickness distribution in which a thickness d1 in the central region a1 is different from a thickness d2 in the edge region a2. For example, the thickness d1 in the central region a1 may be ⅔ or less than the thickness d2 of the edge region a2. In other words, the thickness d2 may be 1.5 times or more than the thickness d1. For example, the insulating layer 140 may have a thickness distribution in which the thickness d1 of the insulating layer 140 in the central region a1 is different from a maximum length element d3 of the neighboring region a3. For example, the thickness d1 in the central region a1 may be ½ or less than the maximum length element d3 of the neighboring region a3. In other words, the thickness d3 may be 2 times or more than the thickness D1. Also, a thickness of the neighboring region a3 may be greater than a thickness of a non-neighboring region. Here, the non-neighboring region indicates a portion of an insulating layer except for the central region a1, the edge region a2, and the neighboring region a3. The insulating layer 140 may have different breakdown voltage values, depending on a shape and location of the insulating layer 140.

The nanoantenna 150 may face the mirror 120 with the insulating layer 140 therebetween. For example, the nanoantenna 150 may be in the central region a1 of the insulating layer 140 and may face the mirror 120. For example, the nanoantenna 150 may form a resonator structure by facing the mirror 120. Such a resonator structure may be, for example, a Bragg resonator structure or a Febry-Perot resonator structure.

The nanoantenna 150 may adjust a phase of optical modulation and an intensity distribution depending on materials, shapes, and distributions of nanoantenna elements. The nanoantenna 150 may include nanoantenna elements. The nanoantenna elements may be one-dimensionally or two-dimensionally arranged in an array. The nanoantenna elements may have different optical characteristics according to parameters that respectively define the nanoantenna elements. The parameters may include a shape, a thickness, a width, a material, etc. of the nanoantennas. The nanoantenna elements may be arranged to satisfy, for example, a sub-wavelength condition. The sub-wavelength condition may be a condition in which a dimension of length elements (e.g., a thickness, a height, a pitch interval, etc.) that define the shape of the nanoantenna element is less than an operation wavelength of the nanoantenna element. For example, when a pitch interval of the nanoantenna element is less than a half of an operation wavelength of the nanoantenna element, optical modulation efficiency may be improved.

The electrode wire 160 may be provided to operate the nanoantenna 150. The electrode wire 160 may be a component for addressing an electrical signal to the nanoantenna 150. The electrode wire 160 may be on the insulating layer 140. The insulating layer 140 may block electrical interference in such a manner that a voltage applied through the electrode wire 160 is not directly applied to the mirror 120 and the refractive index modulation layer 130.

A bias voltage may be applied to the nanoantenna 150 through the electrode wire 160. When a voltage is applied to the nanoantenna 150 and the mirror 120, a carrier concentration between the insulating layer 140 and the refractive index modulation layer 130 is changed. The change in the carrier concentration between the insulating layer 140 and the refractive index modulation layer 130 may result in a change in a refractive index of the refractive index modulation layer 130. As the refractive index of the refractive index modulation layer 130 is changed, the meta device 100 may have a phase change characteristic and a reflectivity change characteristic of beams. A high permittivity, a small thickness, and a great withstand voltage characteristic of the insulating layer 140 are helpful to strengthen functions of the meta device 100. The withstand voltage characteristic of the insulating layer 140 may differ depending on the shape thereof. For example, a withstand voltage characteristic of the insulating layer 140 in a planar portion is different from that in an edge portion. In an edge portion that includes protrusions or bumps, an electric field of the insulating layer 140 is concentrated on the edge portion, and thus, the insulating layer 140 may have a low withstand voltage characteristic. Thus, the insulating layer 140 may have a thickness distribution in which the thickness d1 in the central region a1 is less than the thickness d2 in the edge region a2. As a result, the withstand voltage characteristic in the edge region a2 may be improved. For example, a breakdown voltage of the insulating layer 140 in the edge region a2 may be identical to that in the central region a1. Accordingly, since a higher voltage may be applied through the electrode wire 160, efficiency in a phase change of the meta device 100 may be improved, and a reflectivity change rate of the meta device 100 may increase.

Figure 2:
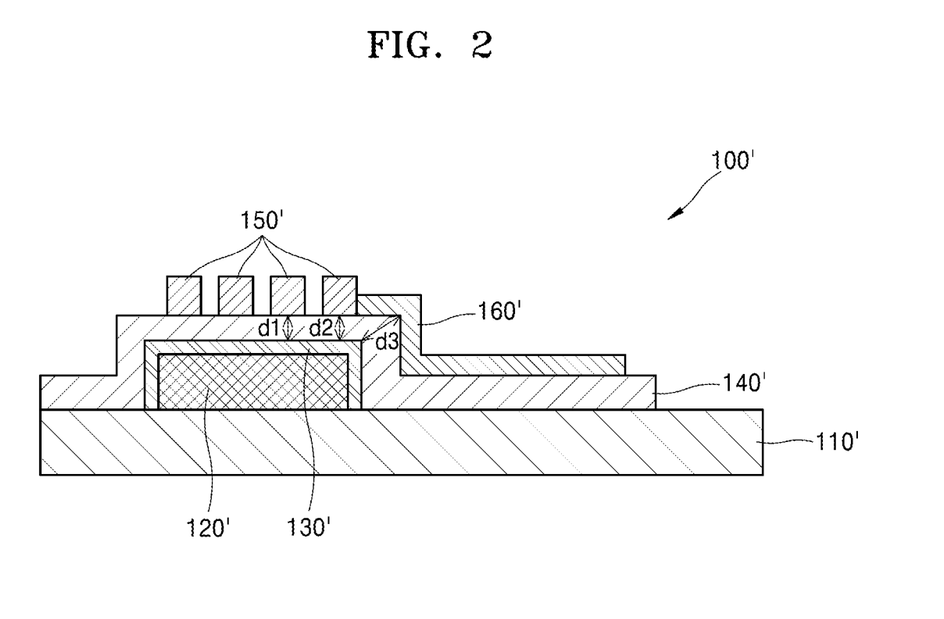
FIG. 2 is a schematic cross-sectional view of a meta device according to a comparative example.

Upon comparing a meta device 100' according to a comparative example of FIG. 2 to the meta device 100 according to the present example embodiment, when a thickness d1 of an insulating layer 140' in a central region is identical to a thickness d2 in an edge region, a breakdown voltage in the edge region having the thickness d2 may be lower than that in the central region having the thickness d1. Thus, when a voltage applied to an electrode wire 160' is lower than the breakdown voltage in the central region having the thickness d1, but is higher than the breakdown voltage in the edge region having the thickness d2, a breakdown occurs, and thus, the meta device 100' may be damaged. Therefore, in the thickness distribution of the insulating layer 140', although the central region having the thickness d1 has a sufficient withstand voltage, the breakdown voltage decreases in the thickness d2 or d3 of the edge region, and thus applying a high voltage that does not cause a breakdown at the central region may cause a breakdown at the edge region. In this sense, it may be difficult to apply a high voltage to edge portion. On the contrary, the meta device 100 according to the present example embodiment has a non-uniform thickness distribution in which the thickness of the insulating layer 140 differs depending on the shape and location thereof, and thus, the meta device 100 may obtain a desired overall breakdown voltage value.

Figure 3:
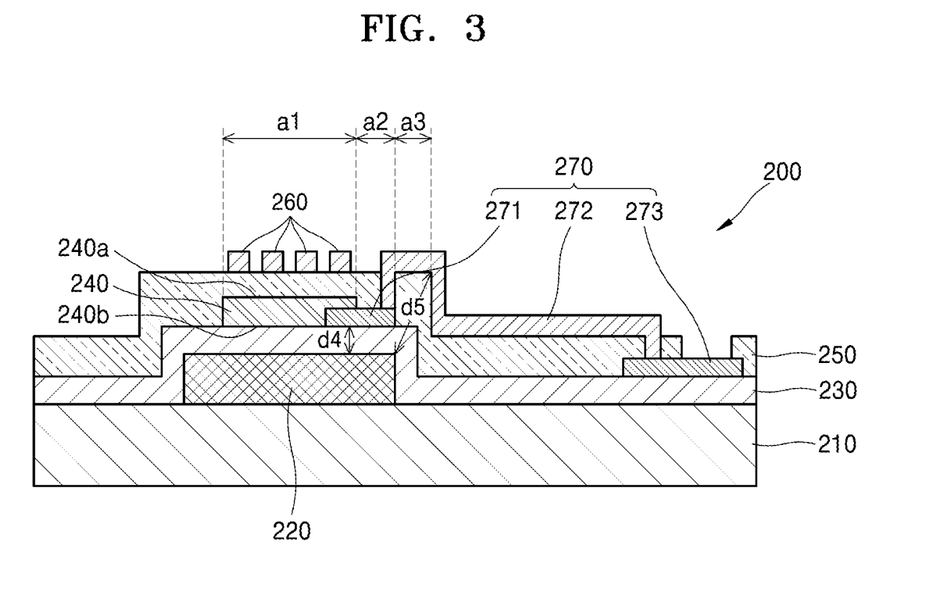
FIG. 3 is a schematic cross-sectional view of a meta device according to an example embodiment.

FIG. 3 is a schematic cross-sectional view of a meta device 200 according to an example embodiment.

Referring to FIG. 3, the meta device 200 includes a substrate 210, a mirror 220, a first insulating layer 230, a refractive index modulation layer 240, a second insulating layer 250, a nanoantenna 260, and an electrode wire 270.

The substrate 210 may include a glass substrate, a silicon substrate, a sapphire substrate, or a polymer substrate, but is not limited thereto.

The mirror 220 is on the substrate 210. The mirror 220 may include a conductive material. For example, the mirror 220 may include a metal material such as Au, Pt, Ag, or Cu.

The first insulating layer 230 may be on the mirror 220 and the substrate 210. For example, the first insulating layer 230 may include $SiO_2$, $SiN_x$, $HfO_2$, or $Al_2O_3$. For example, the first insulating layer 230 may have a uniform thickness, that is, a thickness d4. However, the thickness of the first insulating layer 230 is not limited thereto.

The refractive index modulation layer 240 may be on the mirror 220 and the first insulating layer 230. The refractive index modulation layer 240 may include a semiconductor. For example, the refractive index modulation layer 240 may include ZnO, $SnO_2$, $TiO_2$, ITO ($In_2O_3+SnO_2$), IZO ($In_2O_3+$ZnO), ZTO (ZnO+$SnO_2$), ZITO (ZnO+$In_2O_3+SnO_2$), GZO, AZO, FTO, a compound thereof, or a mixture thereof.

The second insulating layer 250 may cover the refractive index modulation layer 240. The second insulating layer 250 may be on the first insulating layer 230. The second insulating layer 250 may include $SiO_2$, $SiN_x$, $HfO_2$, or $Al_2O_3$. The first insulating layer 230 and the second insulating layer 250 may include the same material or different materials. A via may be formed in the second insulating layer 250. The via in the second insulating layer 250 may be in an edge region a2 or a neighboring region a3. A thickness distribution of the second insulating layer 250 may be uniform or non-uniform, but is not limited as such.

The nanoantenna 260 may face the mirror 220 with the second insulating layer 250 and the first insulating layer 230 therebetween. The nanoantenna 260 may face an upper surface 240a of the refractive index modulation layer 240 with the second insulating layer 250 therebetween, thus forming a resonator. A lower surface 240b of the refractive index modulation layer 240 may face the mirror 220 and form a resonator. A bias voltage may be applied to the nanoantenna 260 through a wire and the refractive index modulation layer 240 through the electrode wire 270. The meta device 200 according to the present example embodiment may have a double gate structure for transmitting different inputs to the nanoantenna 260 and the refractive index modulation layer 240.

The electrode wire 270 for transmitting an electrical signal to the refractive index modulation layer 240 may be provided. The electrode wire 270 may be a through electrode that penetrates the via in the second insulating layer 250. As the electrode wire 270 penetrates the via located in the edge region a2 or the neighboring region a3, a length of the maximum length element d5 from the mirror 220 to the electrode wire 270 may increase. As described above, a value of the breakdown voltage may be defined based on the material, the shape, and the thickness of the insulating layer. Since an electric field is concentrated in the edge region a2, the breakdown voltage decreases even though the insulating layer has a uniform thickness, and thus the maximum length element d5 of the electrode wire 270 increases by using the via in the second insulating layer 250 to thereby increase the breakdown voltage. For example, the electrode wire 270 may include a first electrode 271 directly contacting the refractive index modulation layer 240, a through electrode 272 for increasing the breakdown voltage, and a second electrode 273 that is a terminal receiving an external input. Although the first insulating layer 230 and the second insulating layer 250 have uniform thickness distribution, a total thickness distribution of the first insulating layer 230 and the second insulating layer 250 may not be uniform. For example, the total thickness distribution of the first insulating layer 230 and the second insulating layer 250 may not be uniform because the second insulating layer 250 has a via structure and the electrode wire 270 includes the through electrode 272. To adjust the value of the breakdown voltage in the edge region a2 and the neighboring region a3, a location of the via that the through electrode 272 penetrates may be adjusted, the thickness of the second insulating layer 250 may be adjusted, or the second insulating layer 250 may include a different material from the first insulating layer 230. Therefore, in terms of a design of a breakdown voltage for improving a withstand voltage characteristic, the meta device 200 according to the present embodiment may be easily adjusted compared to the prior art.

Figure 4:
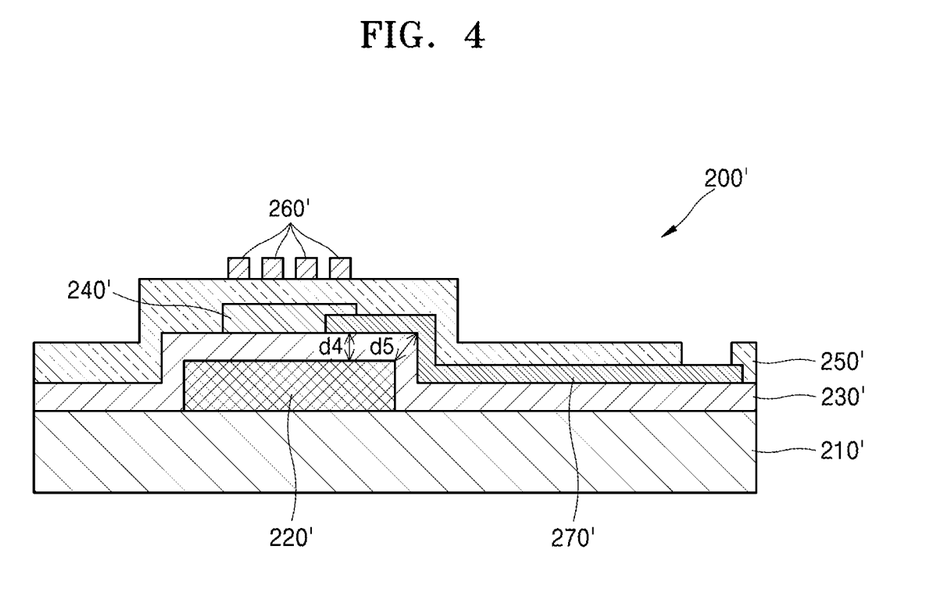
FIG. 4 is a schematic cross-sectional view of a meta device according to a comparative example.

Referring to FIG. 4, a meta device 200' having a double gate structure includes a first insulating layer 230' and a second insulating layer 250' each having a uniform thickness. The second insulating layer 250' according to a comparative example does not include a via, and an electrode wire 270' does not include a through electrode. Thus, a breakdown voltage between a mirror 220' and the electrode wire 270' is determined only by a thickness of the first insulating layer 230'. Since the first insulating layer 230' has a uniform thickness d4 both in a central region and an edge region, a breakdown voltage in the edge region becomes lower than that in the central region. Also, it may be difficult to sufficiently secure a breakdown voltage of a maximum length element d5 of the first insulating layer 230' in the neighboring region. Accordingly, compared to the meta device 200 according to the present example embodiment, the meta device 200' according to a comparative example may not sufficiently secure a withstand voltage characteristic.

FIGS. 5 to 10 are diagrams of a method of manufacturing the meta device 100, according to an example embodiment.

Figure 5:
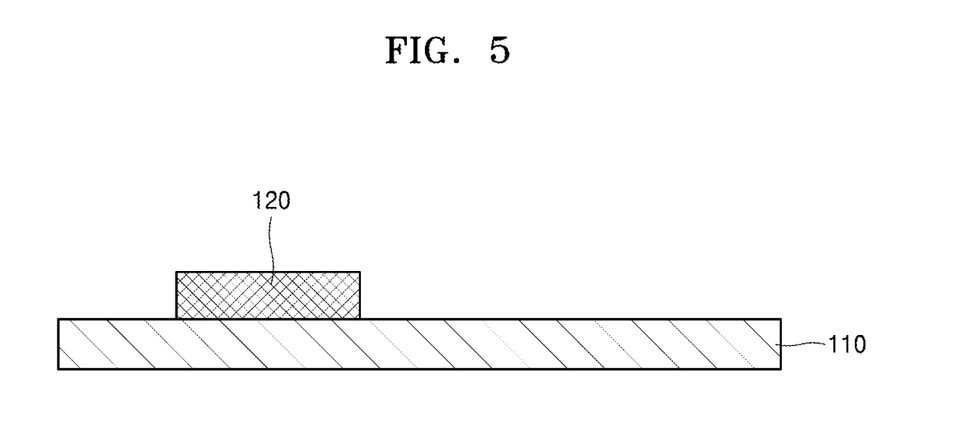
FIGS. 5 to 10 are diagrams of a method of manufacturing a meta device, according to an example embodiment.

Referring to FIG. 5, the mirror 120 may be formed on the substrate 110.

Figure 6:
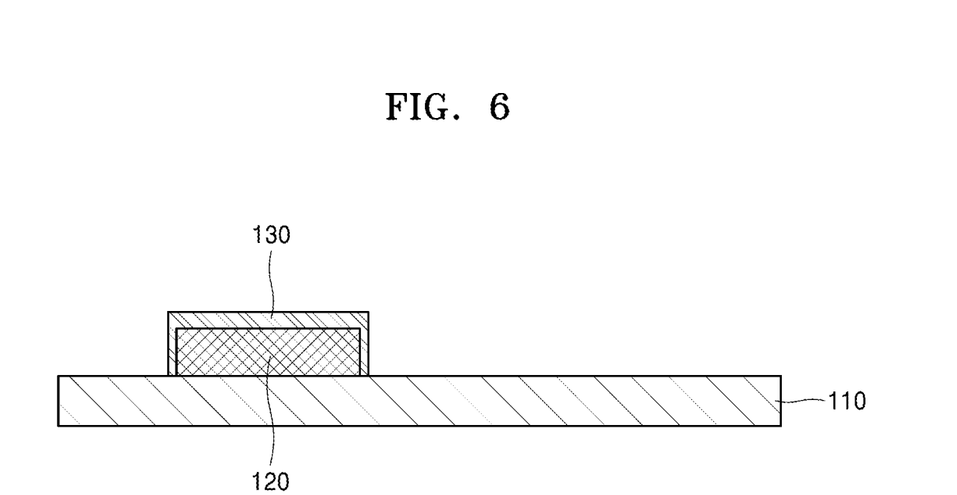

Referring to FIG. 6, the refractive index modulation layer 130 may cover at least some portions of the mirror 120. For example, patterning is performed during a masking process so as to form the refractive index modulation layer 130.

Figure 7:
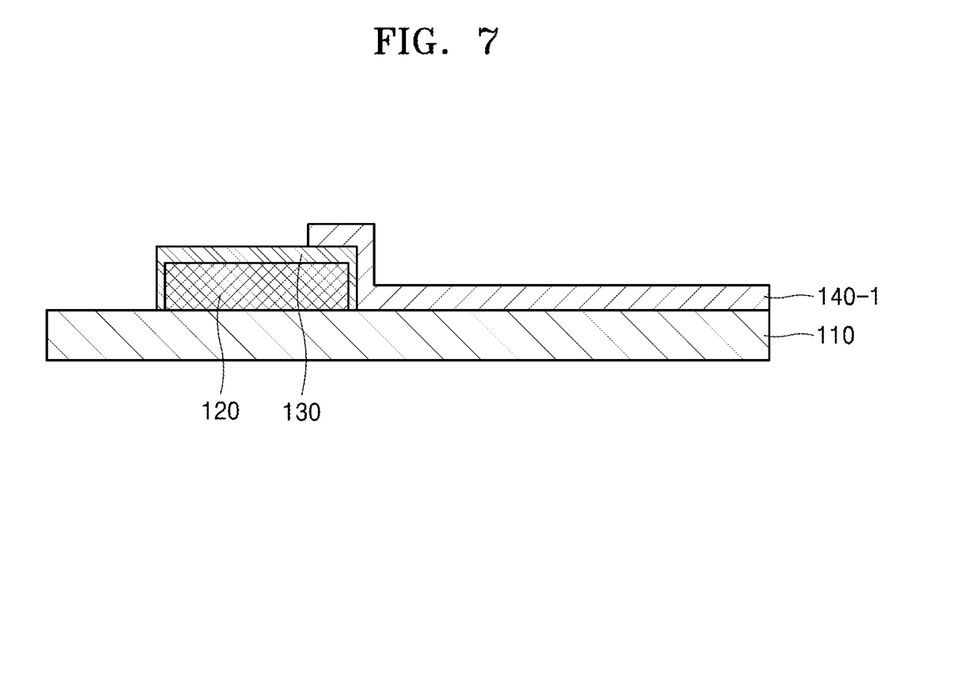

Referring to FIG. 7, a first insulating layer 140-1 may be formed on the mirror 120. For example, with respect to the mirror 120, the first insulating layer 140-1 may cover an edge region and a neighboring region, but may not cover a central region. For example, patterning may be performed to form the first insulating layer 140-1. The first insulating layer 140-1 may have a uniform thickness, but the thickness is not limited thereto.

Figure 8:
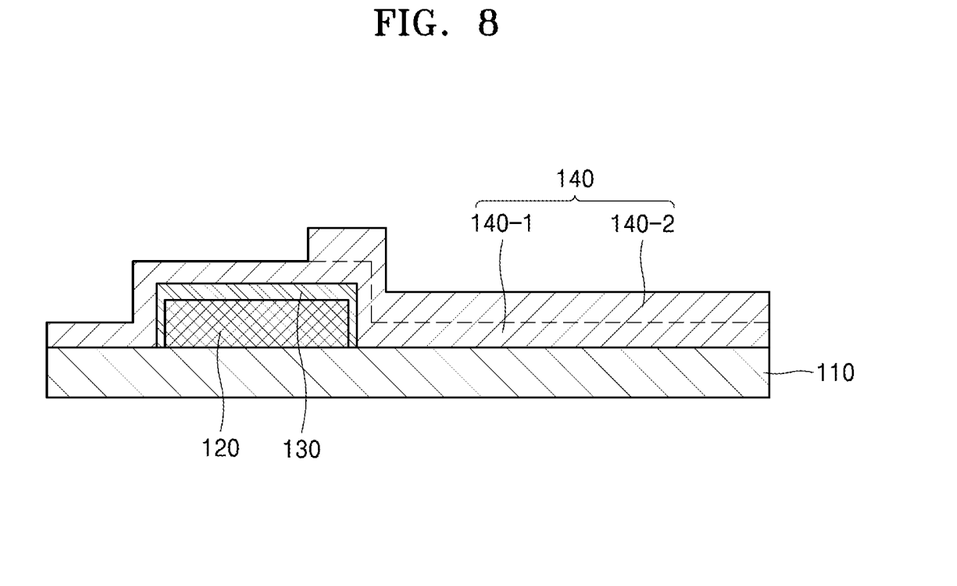

Referring to FIG. 8, a second insulating layer 140-2 may be formed on the mirror 120 and the first insulating layer 140-1. The second insulating layer 140-2 may have a uniform thickness. As a result, the second insulating layer 140-2 may be deposited on the first insulating layer 140-1, and thus the insulating layer 140 may be formed. Since the above processes are sequentially performed, the insulating layer 140 may have a thickness distribution in which thicknesses of the insulating layer 140 in the edge and neighboring regions are greater than the thickness of the insulating layer 140 in the central region.

Figure 9:
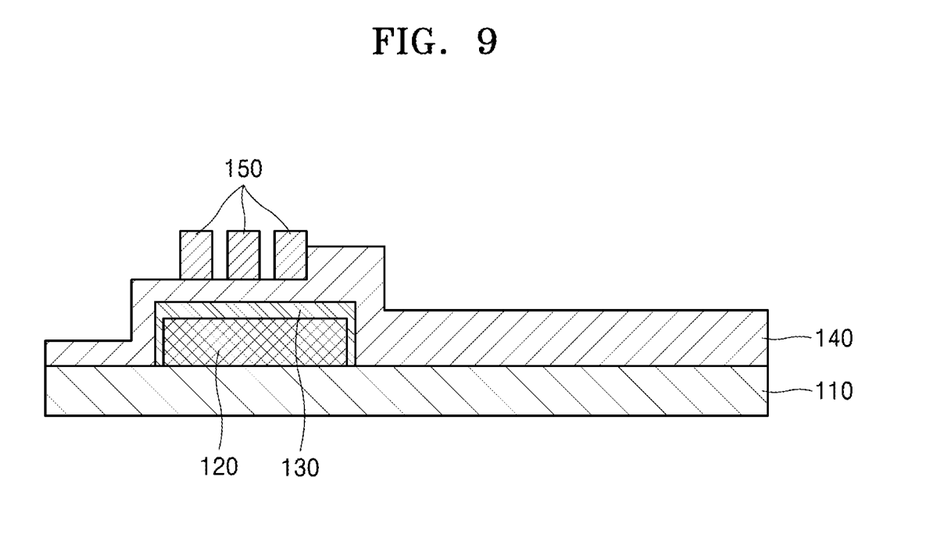

Referring to FIG. 9, the nanoantennas 150 may be formed on the insulating layer 140. The nanoantennas 150 may be formed by using typical semiconductor processes. The nanoantennas 150 may be formed at locations facing the mirror 120 in the central region.

Figure 10:
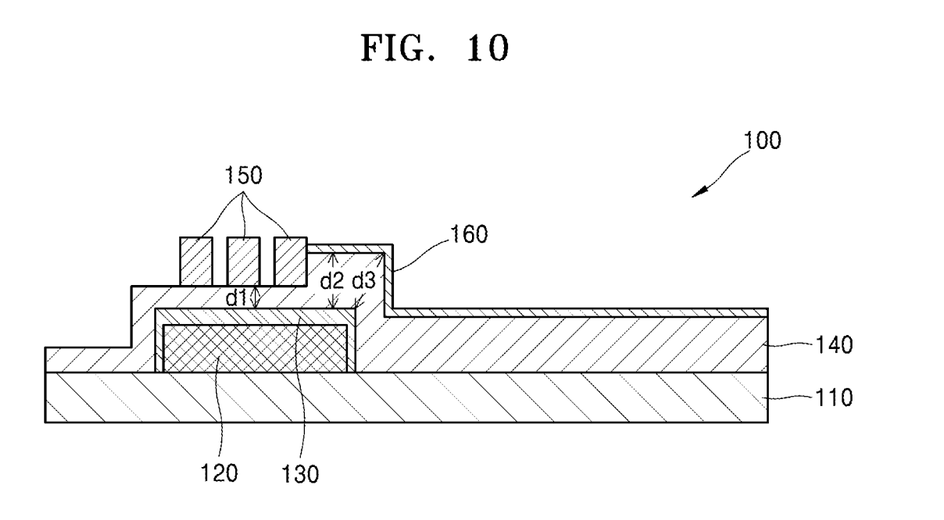

Referring to FIG. 10, the electrode wire 160 may be formed and be electrically connected to the nanoantennas 150. As the first insulating layer 140-1 and the second insulating layer 140-2 are sequentially formed, breakdown voltages are sufficiently high in distances d1, d2, and d3 between the electrode wire 160 and the refractive index modulation layer 130.

To promote understanding of one or more example embodiments of the present disclosure, the example embodiments regarding a meta device have been described with reference to the accompanying drawings.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A beam steering apparatus comprising:
a mirror;
a refractive index modulation layer disposed on the mirror;
a nanoantenna on the refractive index modulation layer; and
an insulating layer disposed between the nanoantenna and the refractive index modulation layer, wherein the insulating layer has a thickness distribution in which a first thickness of the insulating layer on a central region of the mirror is less than a second thickness of the insulating layer on an edge region of the mirror,
wherein a refractive index of the refractive index modulation layer is modulated to control a propagation direction of a beam.

2. The beam steering apparatus of claim 1, wherein the second thickness of the insulating layer on the edge region is 1.5 times or more than the first thickness of the insulating layer on the central region.

3. The beam steering apparatus of claim 1, wherein a maximum length element of the edge region is 2 times or more than the first thickness of the insulating layer on the central region.

4. The beam steering apparatus of claim 1, wherein, the insulating layer has a thickness distribution in which a third thickness of the insulating layer in a neighboring region, that is adjacent to the mirror in a lateral direction, is greater than a fourth thickness of the insulating layer in a non-neighboring region, that is further than the neighboring region from the mirror in the lateral direction.

5. The beam steering apparatus of claim 1, wherein the nanoantenna comprises at least one of a metal material and a semiconductor material.

6. The beam steering apparatus of claim 1, wherein the insulating layer comprises at least one of silicon oxide, silicon nitride, aluminum oxide, and hafnium oxide.

7. The beam steering apparatus of claim 1, wherein the mirror comprises a conductive material.

8. The beam steering apparatus of claim 1, wherein the refractive index modulation layer comprises an oxide semiconductor.

9. The beam steering apparatus of claim 1, further comprising an electrode wire electrically connected to the nanoantenna.

* * * * *